(12) United States Patent
Heinen et al.

(10) Patent No.: US 10,669,023 B2
(45) Date of Patent: Jun. 2, 2020

(54) TACTICAL AERIAL PLATFORM

(71) Applicant: Raytheon Company, Waltham, MA (US)

(72) Inventors: Gregory W. Heinen, Lowell, MA (US); Peter B. Morris, Derry, NH (US); John P. Shea, Andover, MA (US); Charles Miller, Hopkinton, MA (US)

(73) Assignee: Raytheon Company, Waltham, MA (US)

( * ) Notice: Subject to any disclaimer, the term of this patent is extended or adjusted under 35 U.S.C. 154(b) by 1405 days.

(21) Appl. No.: 15/048,303

(22) Filed: Feb. 19, 2016

(65) Prior Publication Data

US 2020/0140071 A1    May 7, 2020

(51) Int. Cl.
   *B64C 29/00* (2006.01)
(52) U.S. Cl.
   CPC ...... *B64C 29/0008* (2013.01); *B64C 29/0016* (2013.01); *B64C 2201/027* (2013.01)
(58) Field of Classification Search
   CPC ............ B64C 29/0008; B64C 29/0016; B64C 29/0033; B64C 2201/027; B64C 2201/148; B64C 27/20; B64C 39/062
   See application file for complete search history.

(56) References Cited

U.S. PATENT DOCUMENTS

| | | |
|---|---|---|
| 2,952,422 A | 9/1960 | Fletcher et al. |
| 2,969,936 A | 1/1961 | Dorman et al. |
| 2,971,724 A | 2/1961 | Zborowski |
| 3,000,593 A | 9/1961 | Eggers et al. |
| 3,049,320 A | 8/1962 | Fletcher |
| 3,065,932 A | 11/1962 | Herrmann |
| 3,135,202 A | 6/1964 | Herrmann |
| 3,135,484 A | 6/1964 | Herrmann |
| 3,253,805 A | 5/1966 | Taylor |
| 4,307,856 A | 12/1981 | Walker |
| 4,365,773 A | 12/1982 | Wolkovitch |

(Continued)

OTHER PUBLICATIONS

Castellanos, Sara, "CyPhy Works aims to bring drones to agriculture, mining, public safety sectors", Boston Business Journal, see following link: /http://www.bizjournals.com/boston/blog/startups/2015/10/cyphy-works-aims-to-bring-drones-to-agriculture.html, published Oct. 13, 2015, retrieved Jan. 13, 2016, 3 printed web pages.

(Continued)

*Primary Examiner* — Richard G Davis
(74) *Attorney, Agent, or Firm* — Renner, Otto, Boisselle & Skalr, LLP

(57) ABSTRACT

An aerial platform having motive devices for obtaining and maintaining loft of the aerial platform, the motive devices being pivotable relative to a wing of the aerial platform for aerial maneuvering of the aerial platform while generally maintaining stable disposition of the wing relative to the ground. The motive devices may include blades having selectively adjustable pitch for varying output force of respective motive devices. The aerial platform may further include one or more bladed turbines outwardly coupled to the wing and drivable by wind for generating power for the aerial platform. In some cases, the aerial platform may be tethered via a flexible power cable to a power source.

19 Claims, 16 Drawing Sheets

(56) References Cited

U.S. PATENT DOCUMENTS

| | | |
|---|---|---|
| 6,053,451 A | 4/2000 | Yu |
| 6,086,279 A | 7/2000 | Yen |
| 6,089,290 A | 7/2000 | Chlebina et al. |
| 6,183,354 B1 | 2/2001 | Zuniga et al. |
| 6,210,255 B1 | 4/2001 | Zuniga et al. |
| 6,224,753 B1 | 5/2001 | Marbach |
| 6,252,582 B1 | 6/2001 | Rogers et al. |
| 6,254,032 B1* | 7/2001 | Bucher ............... B64C 29/0033 244/12.2 |
| 6,264,779 B1 | 7/2001 | Cappelli et al. |
| 6,290,810 B1 | 9/2001 | Yovichin et al. |
| 6,311,780 B1 | 11/2001 | Zuev et al. |
| 6,386,955 B2 | 5/2002 | Zuniga et al. |
| 6,464,459 B2 | 10/2002 | Illingworth |
| 6,475,181 B1 | 11/2002 | Potter et al. |
| 6,478,242 B1 | 11/2002 | Knobbe et al. |
| 6,536,798 B1 | 3/2003 | Hamilton |
| 6,540,594 B2 | 4/2003 | Zuniga et al. |
| 6,595,452 B1 | 7/2003 | Berthaud et al. |
| 6,616,094 B2 | 9/2003 | Illingworth |
| 6,783,096 B2 | 8/2004 | Baldwin |
| 6,796,519 B1 | 9/2004 | Knobbe et al. |
| 6,799,747 B1 | 10/2004 | Lai |
| 6,845,941 B2 | 1/2005 | Pica |
| 6,857,946 B2 | 2/2005 | Zuniga et al. |
| 6,948,910 B2 | 9/2005 | Polacsek |
| 7,014,523 B2 | 3/2006 | Anderson |
| 7,040,971 B2 | 5/2006 | Zuniga et al. |
| 7,059,562 B2 | 6/2006 | Baldwin |
| 7,100,867 B2 | 9/2006 | Houck, II |
| 7,114,685 B1 | 10/2006 | Schulein |
| 7,201,346 B2 | 4/2007 | Hansen |
| 7,294,118 B2 | 11/2007 | Saulenas et al. |
| 7,331,396 B2 | 2/2008 | Reimert et al. |
| 7,331,886 B2 | 2/2008 | Morris et al. |
| 7,413,008 B2 | 8/2008 | Basso |
| 7,523,965 B2 | 4/2009 | Masarwa |
| 7,975,980 B2 | 7/2011 | Gao et al. |
| 8,016,225 B2 | 9/2011 | Gentile |
| 8,066,225 B1 | 11/2011 | Tigner |
| 8,109,905 B2 | 2/2012 | Saulenas et al. |
| 8,152,008 B2 | 4/2012 | Cho |
| 8,246,642 B2 | 8/2012 | Houser et al. |
| 8,262,016 B2 | 9/2012 | Gosling |
| 8,327,502 B2 | 12/2012 | Tsai |
| 8,328,131 B2 | 12/2012 | Gosling |
| 8,408,489 B2 | 4/2013 | Gosling |
| 8,461,713 B2 | 6/2013 | Sammy |
| 8,580,042 B2 | 11/2013 | Nuch et al. |
| 8,671,961 B2 | 3/2014 | Nuch et al. |
| 8,695,952 B2 | 4/2014 | Shebuski |
| 8,829,706 B1 | 9/2014 | Sammy |
| 8,939,711 B2 | 1/2015 | Lee et al. |
| 8,960,593 B2 | 2/2015 | Elder |
| 9,045,227 B1 | 6/2015 | Gramling |
| 9,499,266 B1* | 11/2016 | Garreau ............... B64C 29/0033 |
| 2007/0215746 A1* | 9/2007 | Rieken ................... B64C 39/06 244/6 |
| 2011/0042509 A1* | 2/2011 | Bevirt ................. B64C 29/0033 244/12.4 |
| 2013/0026304 A1* | 1/2013 | Wang .................. B64C 29/0033 244/7 R |
| 2016/0083115 A1* | 3/2016 | Hess ......................... B64F 3/02 701/3 |
| 2016/0207626 A1* | 7/2016 | Bailey .................... B64C 39/022 |
| 2017/0190444 A1* | 7/2017 | Hundemer ............ B64C 39/022 |
| 2017/0327218 A1* | 11/2017 | Morin ..................... B64C 3/385 |

OTHER PUBLICATIONS

McNeil, Bill, "CyPhy Works' new drone takes off on Kickstarter", Directions Magazine, see following link: http://www.directionsmag.com/entry/cyphy-works-new-drone-takes-off-on-kickstarter/444961, published Jun. 3, 2015, retrieved Jan. 13, 2016, 3 printed web pages.

* cited by examiner

TACTICAL AERIAL PLATFORM

FIELD OF THE INVENTION

The invention relates generally to a rapidly deployable aerial apparatus, and more particularly to a rapidly deployable tactical platform having sensor capabilities.

DESCRIPTION OF THE RELATED ART

Aerial platforms are used for a wide variety of applications such as for placement of radar, sensors, communications equipment, weapons, etc. When airborne, these platforms are often subject to tremendous forces due to wind lift and drag. As a result such aerial platforms typically encounter a tradeoff with respect to flight dynamics versus relatively stationary aerial stability. Thus conventional aerial platforms are typically suitable only for either continued flight or relatively stationary positioning, but not both. To counter wind forces, complicated systems are often utilized resulting in increased weight and profile of such platforms, accompanied by limits with respect to altitude, positional stability, power requirements, airborne duration, and speed of deployment.

SUMMARY OF THE INVENTION

The present invention addresses many of the challenges of a typical aerial platform. An aerial platform may be provided having a wing, such as an annular wing, having inboard variable pitch rotors, which may be powered by a ground-connected tether. The rotors are gimbaled relative to the wing, such as to enable a fixed angle of attack to be maintained both when in response to a force acting on the wing, such as when countering wind, and during forward movement to counter negative pitch caused by the movement. The rotors are fixedly coupled to one another and are gimbaled for pivoting movement inwardly of the wing. Blades of each respective rotor have respective planes of rotation, wherein the planes of rotation are fixed relative to one another.

An exemplary aerial platform includes a central section having at least two motive devices for providing loft of the aerial platform, an outer wing extending at least partially about the central section, and a gimballing element interconnecting the central section and the outer wing for allowing rotation of the central section relative to the outer wing.

The gimballing element may define a pivot axis of the motive devices for joint movement about the pivot axis.

The at least two motive devices may be oppositely disposed to one another about the gimballing element.

Each of the motive devices may include a plurality of blades, each blade of a respective plurality of blades being synchronously rotatable about a respective blade axis extending longitudinally along each respective blade.

Each of the motive devices may include blades having a plane of rotation, wherein the planes of rotation of the motive devices are fixed relative to one another.

Each of the motive devices may include rotatable blades having a plane of rotation, wherein the planes of rotation of the motive devices are parallelly disposed to one another.

The outer wing may be an annular outer wing.

The outer wing may include radar disposed along a radially inner portion of the outer wing.

The aerial platform further may include at least two oppositely disposed bladed rotors coupled to the outer wing and positionable for blade rotation radially outwardly of the outer wing.

The aerial platform may be in combination with a power source for supplying power to the aerial platform and a flexible power cable extendable between the power source and the aerial platform for tethering the aerial platform to the power source.

A method of maneuvering the aerial platform may include the steps of (a) driving rotation of blades of each of the motive devices at a uniform speed, and (b) selectively adjusting blade pitch of each blade of at least one of the motive devices to vary the motive force provided by the respective motive device.

The method further may include the step of causing the motive devices to rotate about a pivot axis defined by the gimballing element.

Another exemplary aerial platform includes at least two interconnected motive devices for providing loft of the aerial platform, a wing disposed about the motive devices, wherein the motive devices are pivotably coupled to the wing for synchronous pivoting radially inward of the wing, and at least one bladed turbine outwardly coupled to the wing separately from the motive devices for generating power.

The at least one bladed turbine may be pivotably coupled to the wing.

The motive devices may include blades rotatable about a center axis, the blades of each respective motive device being adjustable in unison to adjust the pitch of the respective blades.

A method of maneuvering the aerial platform may include the steps of (a) driving the motive devices to obtain and maintain loft of the aerial platform, and (b) controlling position of the aerial platform relative to the ground via (i) adjusting pitch of blades of the motive devices, and (ii) generating power via at least one bladed turbine of the aerial platform.

Yet another exemplary aerial platform includes a body and at least two variable pitch rotors fixedly coupled to one another and gimbaled to the body.

The body may include a wing may having an annular shape, where the at least two variable pitch rotors are gimbaled for pivoting movement inwardly of the wing.

Blades of each respective rotor of the at least two rotors may have a respective plane of rotation, wherein the planes of rotation are fixed relative to one another.

The aerial platform may be in combination with a ground unit and a tether extending between the ground unit and the aerial platform.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the disclosure.

DETAILED DESCRIPTION

The present invention provides a rapidly deployable aerial platform, such as for force protection, surveillance, intelligence, or reconnaissance operations. The aerial platform is configured to provide rapid maneuverability responses. Gimballing of motive devices of the aerial platform to a wing of the platform enables the wing to generally maintain its attack angle during maneuvering of the wing relative to the ground. In some cases, bladed rotors may be coupled to the wing, such as for further preventing movement of the aerial platform relative to a ground position. In some cases the aerial platform may be tethered to a ground unit, such as a ground power unit, via a flexible cable, such as a power cable. The aerial platform may be configured to rapidly separate from the ground unit, such as in the case of a rapid pursuit of a target.

The aerial platform of the present disclosure may have military, commercial or other applications not limited to surveillance, intelligence, reconnaissance or force protection operations. For example the aerial platform may be configured for carrying supplies, weapons, sensors, communications equipment, etc. It will thus be appreciated that the aerial platform may be configured for any aerial application requiring tethered or non-tethered flight.

Figure 1:
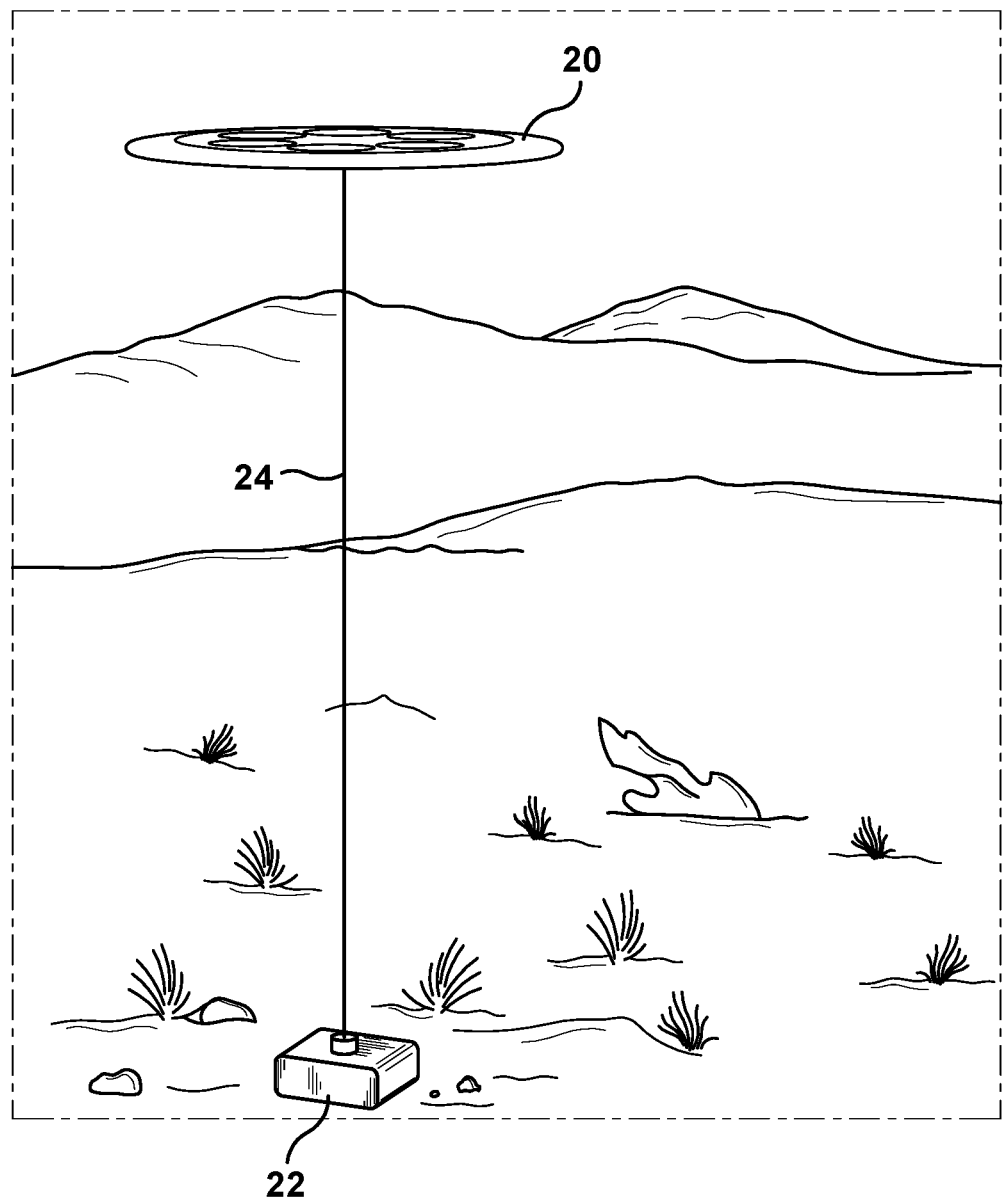
FIG. 1 is a schematic environmental view of an aerial platform tethered to a non-aerial unit in accordance with the disclosure.
Figure 2:
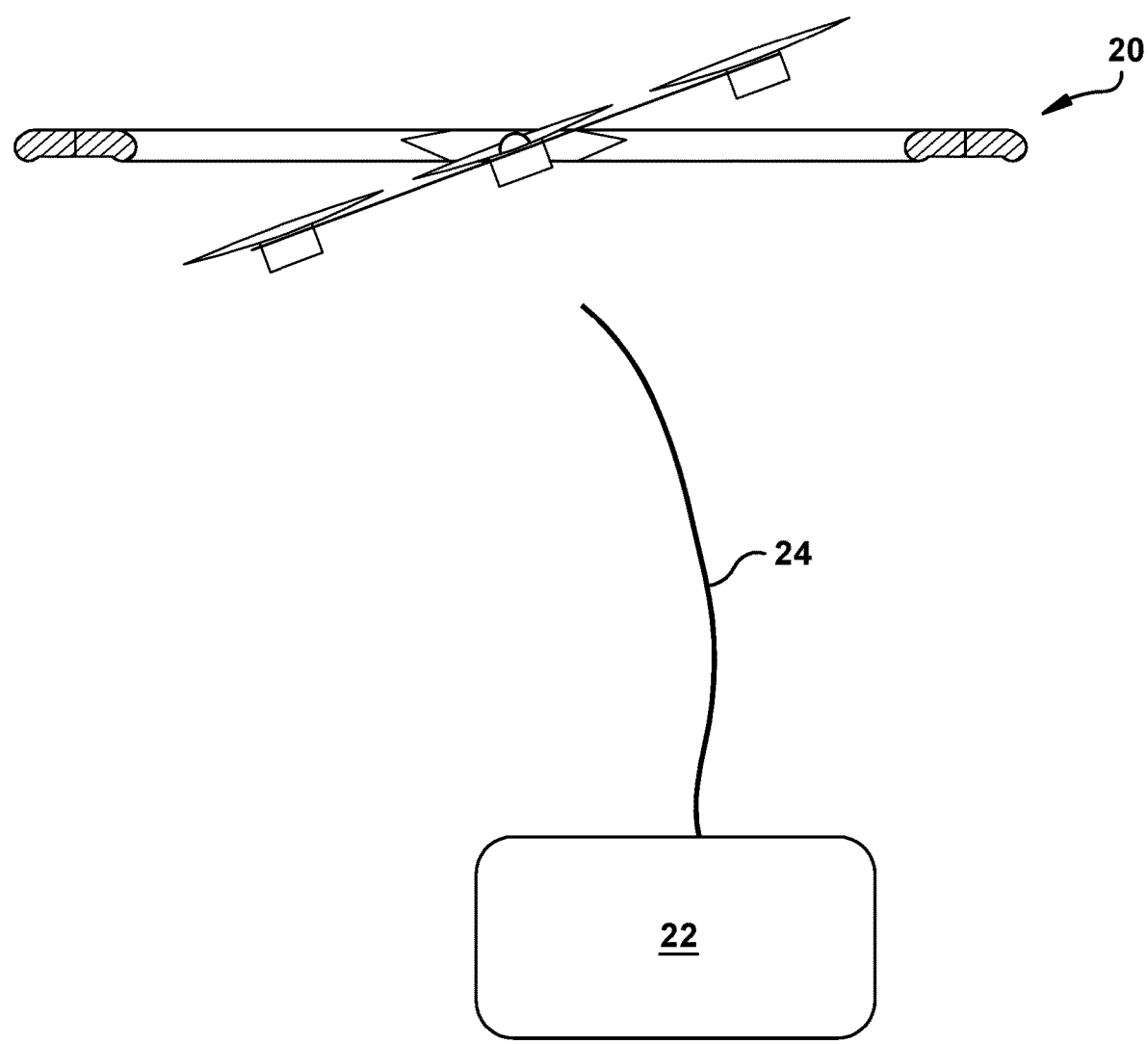
FIG. 2 is yet a schematic view of the aerial platform of FIG. 1 in flight, in partial cross-section.

An exemplary aerial platform 20 in accordance with the present disclosure is shown first at FIGS. 1 and 2. The aerial platform 20 is shown in combination with a non-aerial unit, such as a ground unit 22. The ground unit 22 may or may not be itself mobile. The aerial platform 20 may be connected to the ground unit 22 via a tether 24. In some embodiments, the ground unit 22 may include a power source for providing power to the aerial platform 20 for any number of reasons including powering flight equipment or other onboard equipment. Where the ground unit 22 includes a power source, the tether 24 may include a power cable, such as a flexible power cable.

It will be appreciated that one or both of the ground unit 22 or the aerial platform 20 may have a suitable mechanism to store, release, and retract at least a portion of the tether 24. It will also be appreciated that the aerial platform 20 may be configured to be released from the tether 24, such as for a cut and chase/tactical pursuit operation. In FIG. 2, for example, the aerial platform 20 is shown being released from the tether 24. The disconnecting may be a selectively controlled active disconnect where any suitable mechanism may be used to detach the tether 24, such as a mechanical disconnect, etc. In other cases, the aerial platform 20 may accelerate in a direction, causing the tether 24 to disconnect from the aerial platform.

For example, the aerial platform 20 may be capable of speeds of up to about 100 miles per hour.

As will be further detailed, the aerial platform 20 is generally constructed to provide rapid deployment of equipment to an altitude above the ground, such as up to about 1000 feet, for example. Though, the aerial platform 20 may be capable of greater altitude flight in some embodiments. The aerial platform 20 may also be constructed to provide one or both of rapid positional maneuverability or stability of the aerial platform 20 relative to a ground position, such as a position of the ground unit 22.

Figure 3:
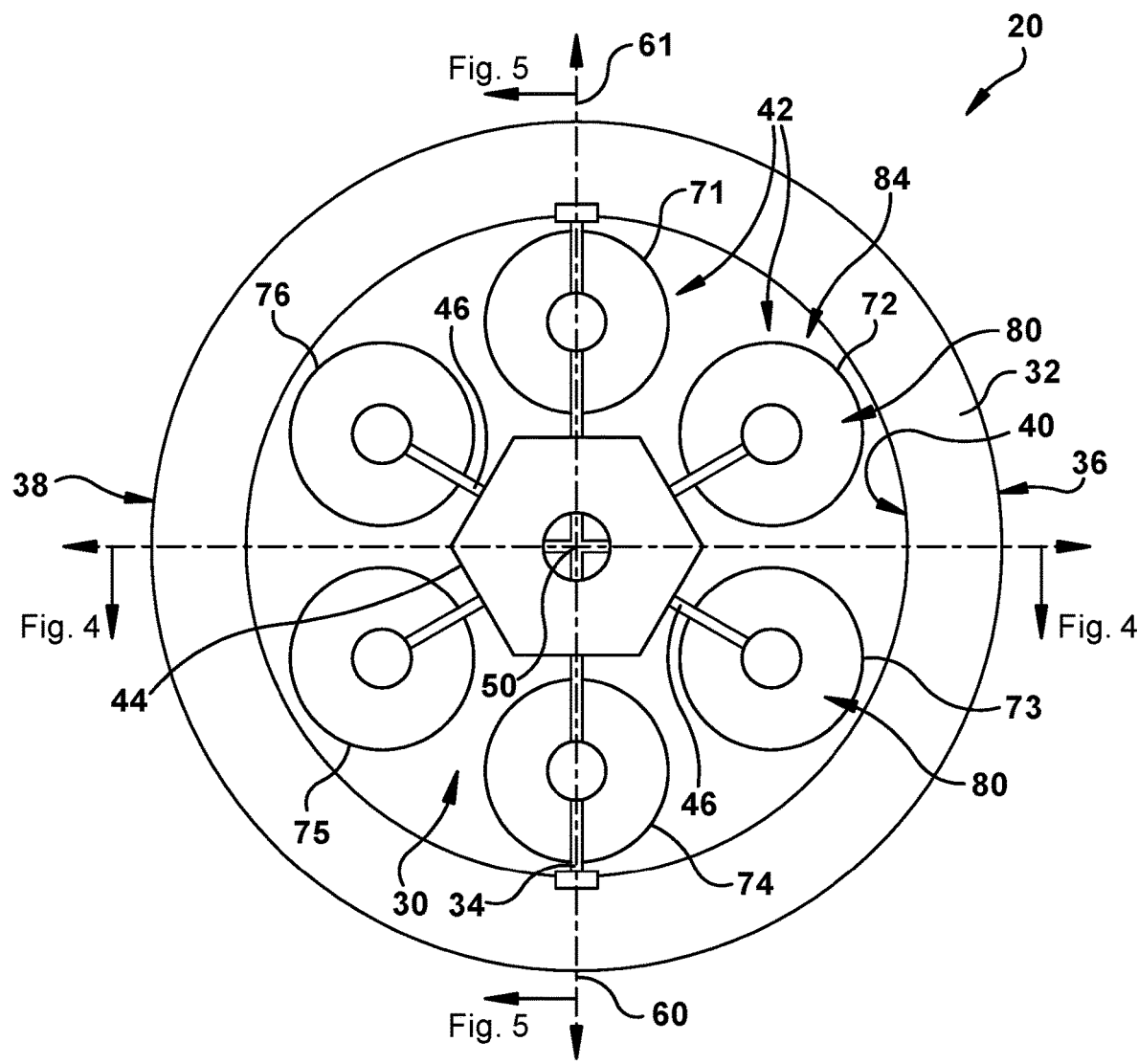
FIG. 3 is a schematic top view of the aerial platform of FIG. 1
Figure 4:
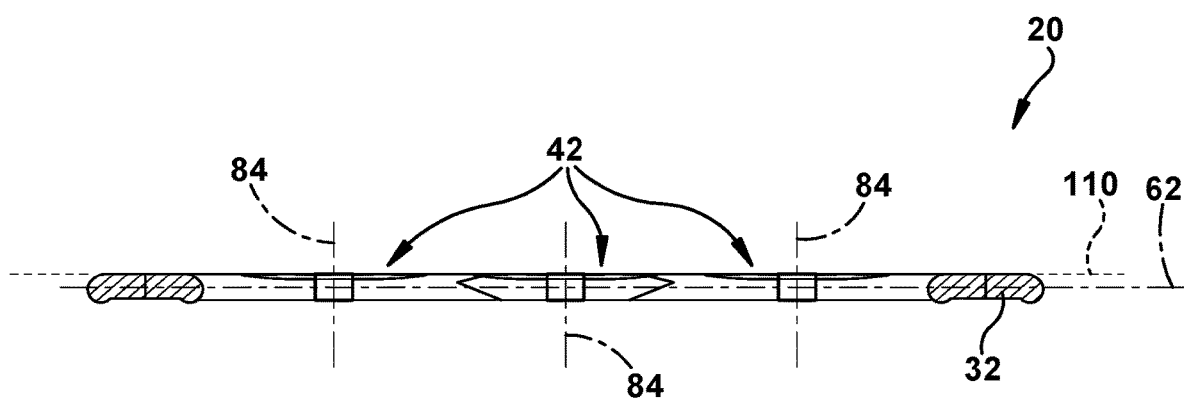
FIG. 4 is a schematic side view of the aerial platform of FIG. 1 in partial cross-section.
Figure 5:
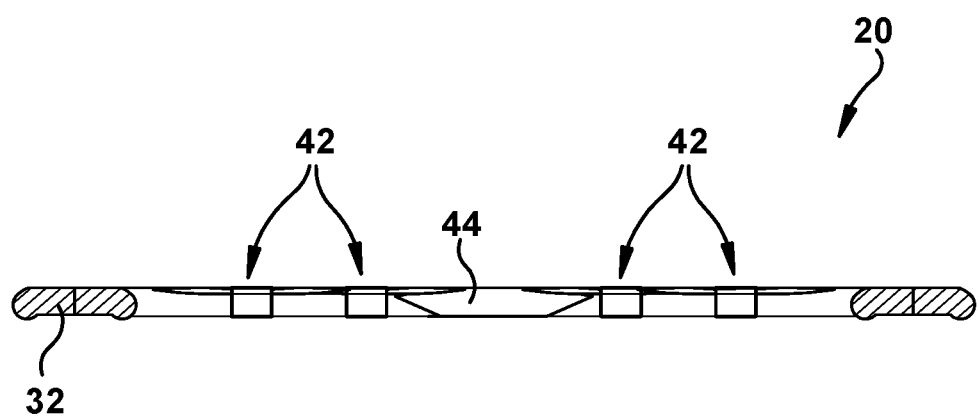
FIG. 5 is a schematic front view of the aerial platform of FIG. 1 in partial cross-section.

Turning now to FIGS. 3-5, the aerial platform 20 is schematically shown. The depicted aerial platform 20 includes a central section 30 and an outer wing 32. At least a portion of the central section 30 is connected to the outer wing 32 via an interconnecting element 34.

The outer wing 32, such as an aerodisk, is shaped such that it has a leading edge 36, aft edge 38, and an interior edge 40. It will be appreciated that "leading" and "aft" are naming conventions, and that either the leading edge 36 or the aft edge 38 may be the front edge with respect to movement of the aerial platform 20. The leading and aft edges 36 and 38 have a relatively thin cross-section for providing efficient flight. During flight, the aerial platform 20 obtains lift from winds, such as prevailing winds via the leading and aft edges 36 and 38.

The outer wing 32 may have any suitable shape, such as being annular. For example, the outer wing 32 may be circular, as shown in FIGS. 3-5. The wing 32 may extend fully circumferentially about the central portion 30 as shown. In other embodiments, the wing 32 may not extend fully circumferentially about the central portion 30.

Figure 8:
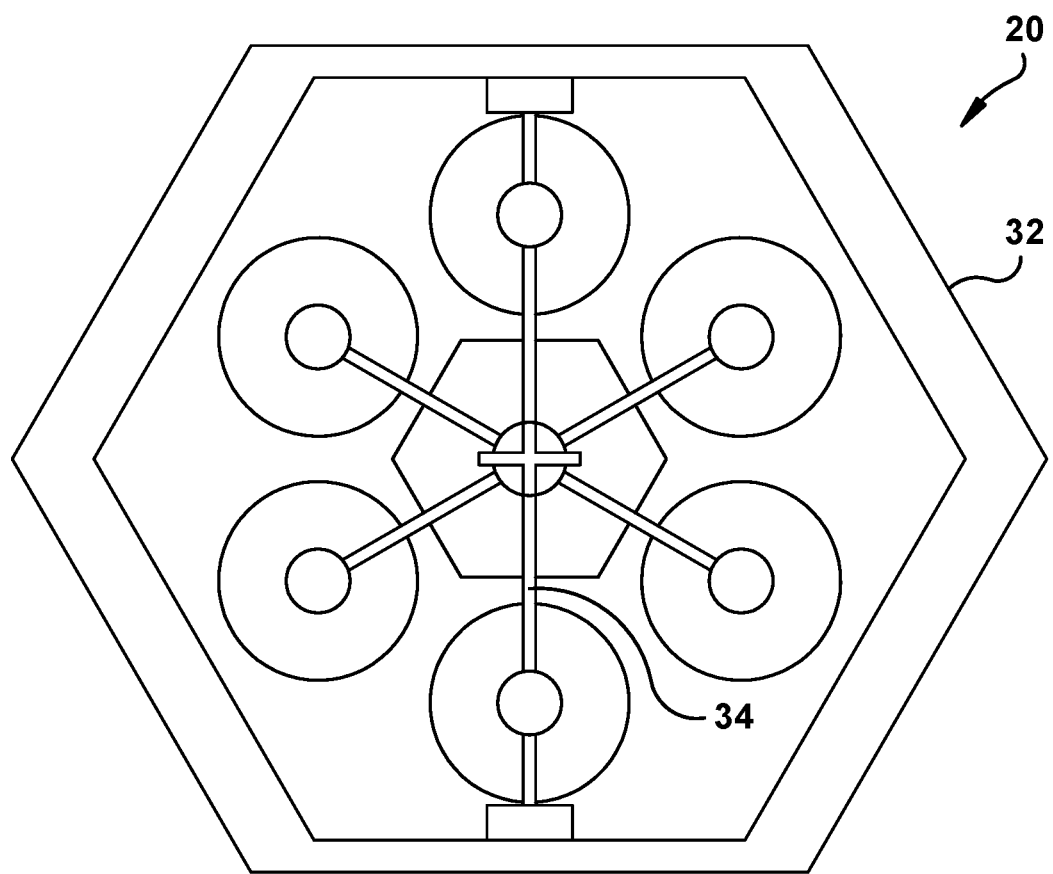
FIG. 8 is a schematic top view of another aerial platform in accordance with the disclosure.
Figure 9:
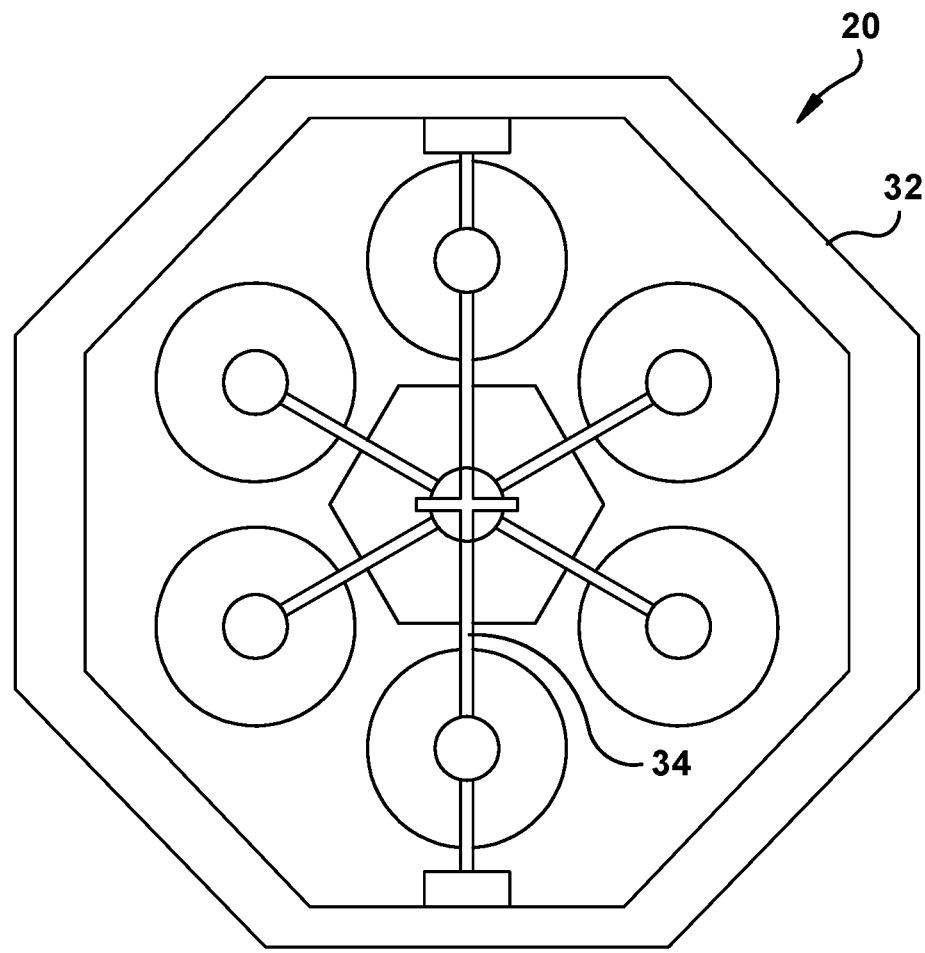
FIG. 9 is a schematic top view of yet another aerial platform in accordance with the disclosure.
Figure 10:
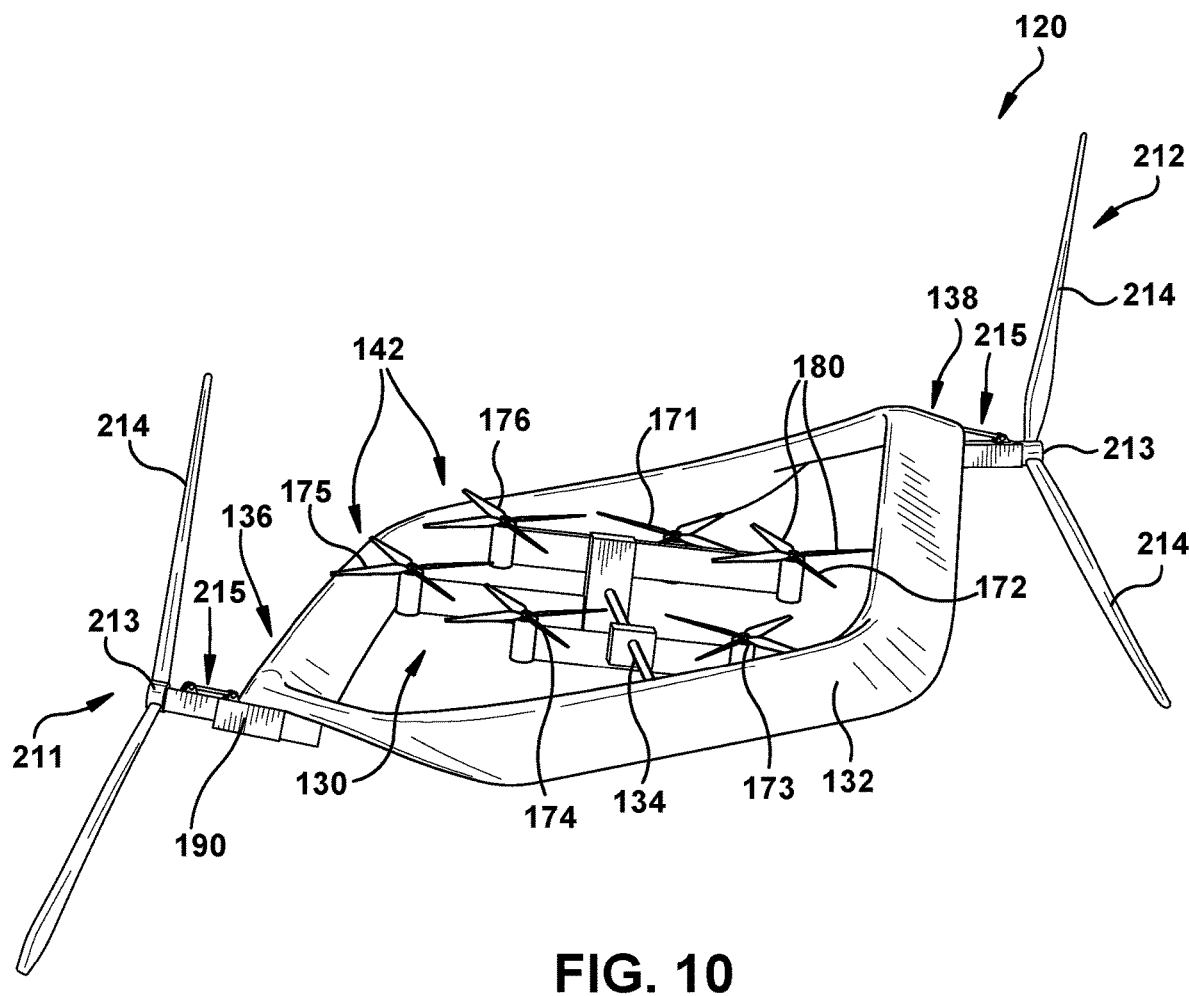
FIG. 10 is a schematic orthogonal view of still another aerial platform in accordance with the disclosure.
Figure 11:
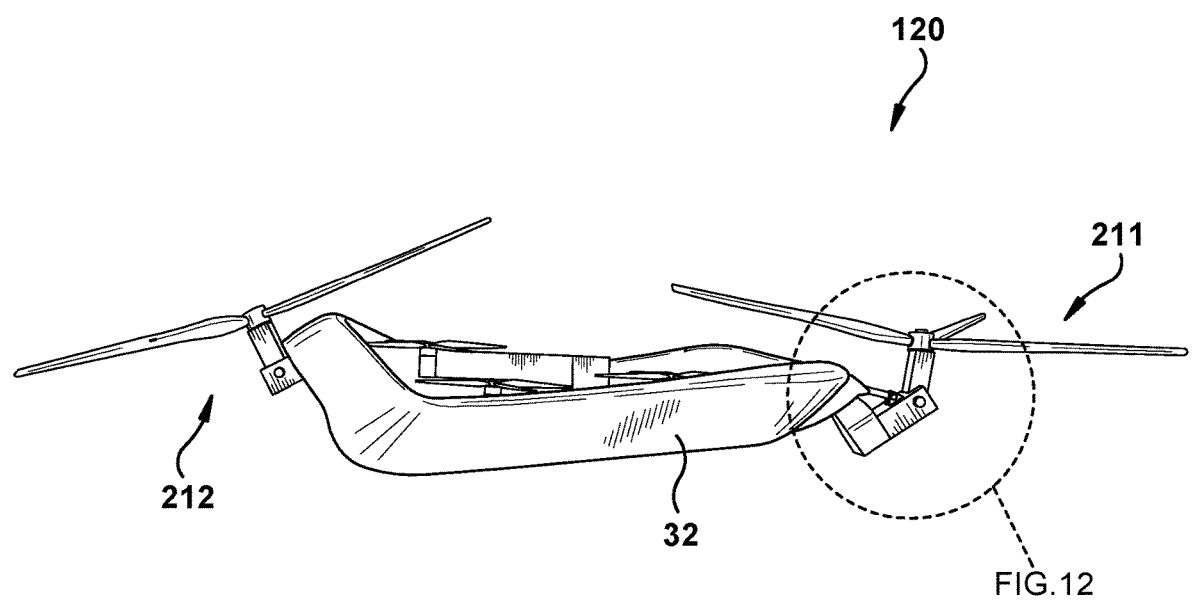
FIG. 11 is another schematic orthogonal view of the aerial platform of FIG. 10.
Figure 12:
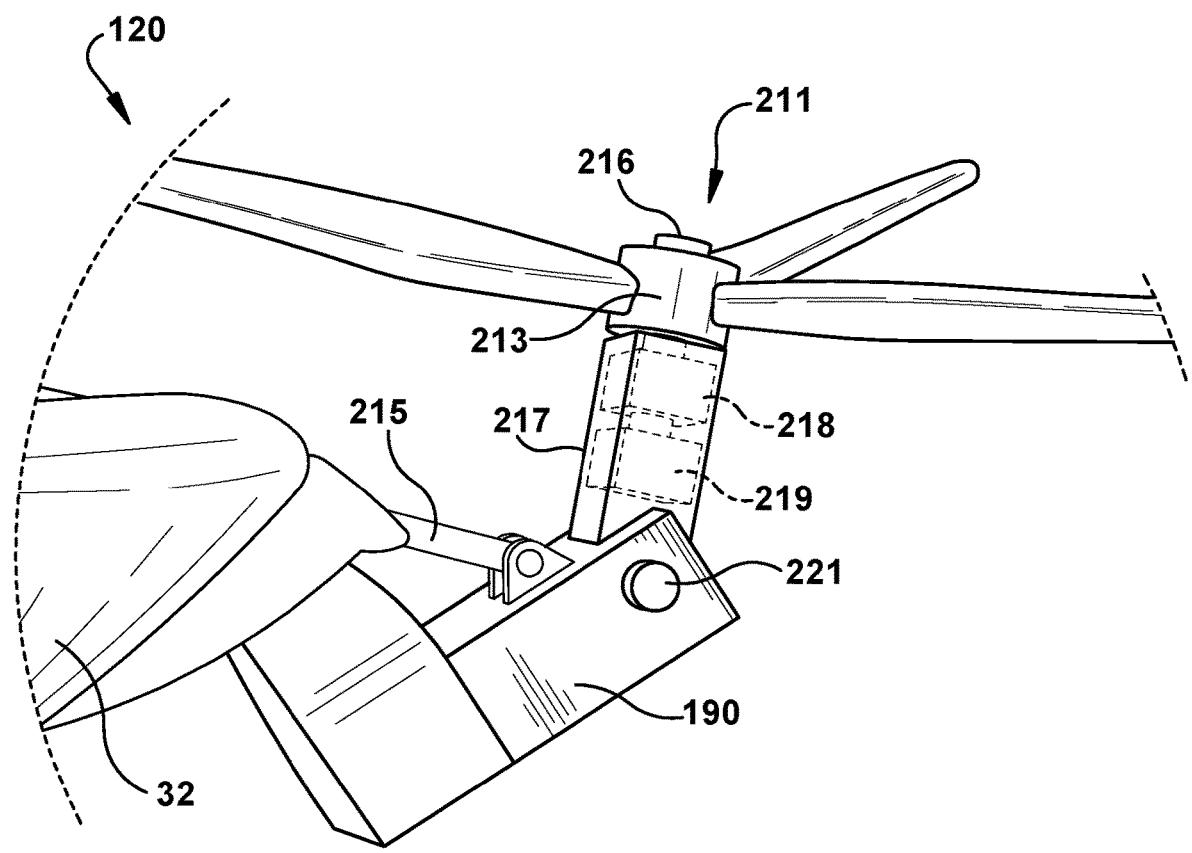
FIG. 12 is a schematic view of a turbine of FIG. 11.
Figure 13:
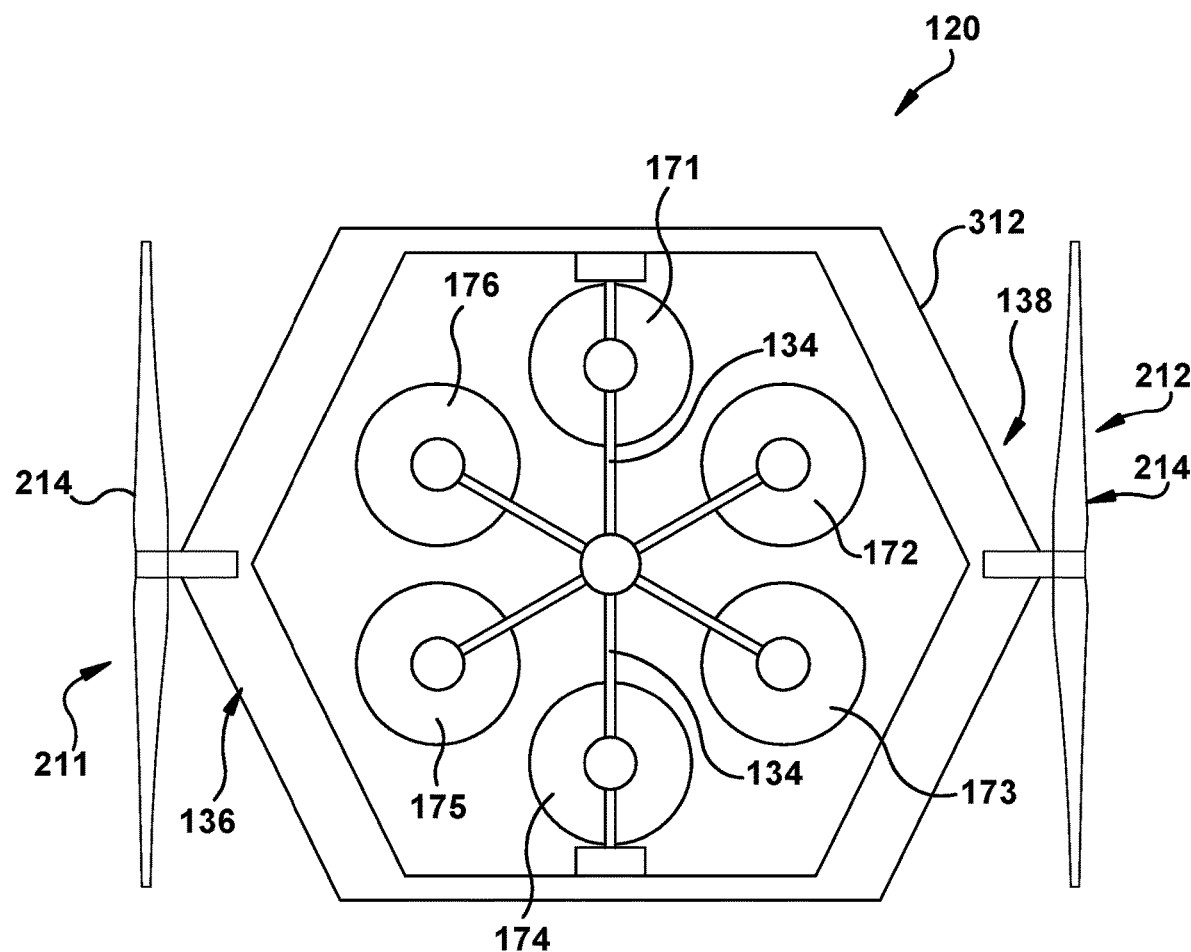
FIG. 13 is a schematic top view of the aerial platform of FIG. 10.

In other embodiments shown in FIGS. 8 and 9, the outer wing 32 may instead have a hexagonal shape (FIG. 8) or an octagonal shape (FIG. 9), for example. In even other embodiments, the interconnecting element 34 may extend between vertices of a hexagonal, octagonal, or otherwise shaped wing, rather than between sides of the shaped wing extending between respective vertices, as shown in FIGS. 8 and 9.

Turning again to the outer wing 32 depicted in FIGS. 3-5, the outer wing 32 may include a payload having one or more of a phased radar array, linear radar array, horizon scanning radar, GPS, barometer, accelerometer, gyrometer, thermometer, anemometer, electro-optical sensors, infrared sensors, or any other suitable camera or sensor, for example. The payload is not limited to sensing equipment and may additionally or alternatively include communications equipment. It will be appreciated that the lists provided herein are not all-inclusive and that additional or alternative equipment may be included in the wing 32 where suitable.

The depicted wing 32 has a symmetric annular shape, and in particular a circular shape, that is suited for integrating "full spherical" sensor or radar packages, such as horizon scanning radar. For example, such package may be included on a radially inner portion, such as the interior edge 40. As will be appreciated, the interior edge 40 is not an attack edge.

One of ordinary skill in the art will also recognize that aerosymmetry of the wing 32 may reduce effects of wind gusts on the aerial platform 20, enabling the aerial platform 20 to be more stable. As used herein, stability refers to the maintaining of position of the aerial platform 20 in all three axes.

In one embodiment, the outer wing 32 may have an outer wingspan in the range of about 5 feet to about 10 feet, such as about 8 feet. In another embodiment the wingspan may be in the range of about 1 foot to about 5 feet.

In one embodiment the wing may have a wing chord in the range of about 5 inches to about 8 inches, such as for example where the wingspan is in the range of about 5 feet to about 10 feet.

Turning again to the illustrated central section 30, motive devices 42 are shown for providing loft of the aerial platform 20. The motive devices 42 are interconnectedly coupled to one another, such as via a centrally disposed structure, for example a central body 44 via framing elements 46. It will be appreciated that in some embodiments, the central body 44 may be omitted, and extended framing elements 46 may instead interconnect the motive devices 42 and serve as a centrally disposed structure.

The framing elements 46 may be any suitable structure, such as rods, for coupling the motive devices 42 to one another. The framing elements 46 may be integral with one another or may be coupled to one another, such as via the central body 44. It will be appreciated that as used herein, coupling may include direct coupling of elements to one another or indirect coupling of elements to one another, such as via at least one intermediate element.

The central body 44 is depicted as being located at the center of gravity of the aerial platform 20. The central body 44 may include a tether attachment 50 at the center of gravity of the aerial platform 20 for coupling to the tether 24, for example. This placement may assist in preventing unnecessary torquing of the aerial platform 20 when tethered via the tether 24.

In some embodiments, the central body 44 may include a power source. The included power source may be sized to provide power to auxiliary equipment of the wing 32, for example. Additionally or alternatively, the included power source may be sized to provide power to the motive devices 42, such as for short term untethered operations.

In some embodiments, the central body 44 may additionally or alternatively have a payload including communications equipment, cameras, a power conversion unit, supplies, explosive weapons, non-explosive weapons, etc.

The combined payload of the central body 44 and the outer wing 32 may be about 100 lbs. The aerial platform 20 absent the payload may be only in the range of about 20 lbs to about 35 lbs, such as about 27 lbs, for example.

The illustrated central body 44 at least partially supports the motive devices 42, which are shown disposed about the central body 44 for providing loft and movement of the aerial platform 20. The plurality of motive devices 42 and the central body 44 are gimbaled relative to the outer wing 32, such as having a single degree of freedom about an axis, such as a central lateral axis 60 of the aerial platform 20, via the interconnecting element 34. As shown, the interconnecting element 34 serves as a gimballing element, such as a two-axis gimballing element, for allowing pivoting of the central section 30 and the gimballing element 34 relative to the outer wing 32. The motive devices 42 are fixedly coupled to the interconnecting element 34 for pivoting with the interconnecting element 34 about the central lateral axis 60.

The illustrated interconnecting element 34 extends along the central lateral axis 60 providing gimballing of the motive devices 42, such as inwardly of the outer wing 32. Thus, the interconnecting element 34 defines a pivot axis 61 of the motive devices 42 for joint movement in unison about the pivot axis 61, where the pivot axis 61 and central lateral axis 60 are colinear. Due to the motive devices 42 being interconnected by the framing elements 46, in turn being coupled to the interconnecting element 34, the motive devices 42 are pivotably coupled to the wing 32 for synchronous pivoting relative to the wing 32.

The interconnecting element 34 may include any suitable structure pivotably supported at least at one pivot point at the wing 32, though as shown, supported at two oppositely disposed pivot points at the wing 32. Structure at the pivot points may include bearings or bushings for reducing frictional forces. Sub-components of the interconnecting element 34 may be connected to the central section 30 and to the outer wing 32 in any suitable manner, such as via welding, fasteners, etc.

It will be appreciated that in some embodiments, the interconnecting element 34 may not be coupled to the central body 44, and may be coupled to the motive devices 42 separately from the central body 44, such as via the framing elements 46. In such case, the central body 44 may be otherwise interconnected to the outer wing 32, such as by additional framing elements, for supporting the central body 44 relative to the outer wing 32. In even other embodiments, the central body 44 may be rotatably affixed, such as via bearings, to the interconnecting element 34, such that the central body 44 is supported by the interconnecting element 34, but does not pivot in unison with the motive devices 42 and the interconnecting element 34 about the pivot axis 61.

The gimballing of the motive devices 42, separate from movement of the outer wing 32, enables the wing 32 to maintain an attack angle during movement or upon encountering a force, such as a prevailing wind. The motive devices 42 are enabled to move, thus allowing the aerial platform 20 to counter a prevailing wind under tethered operation or to better maneuver to an offset position while limiting drag forces on the aerial platform 20. Generally, drag forces are limited as the smallest cross-section of the outer wing 32—an outer edge—is presented to a prevailing wind in the direction of movement. A larger cross-section of the outer wing 32 is not required to be presented in the direction of movement or to a prevailing wind due to the gimballing of the motive devices 42 separately from the outer wing 32.

Figure 7A:
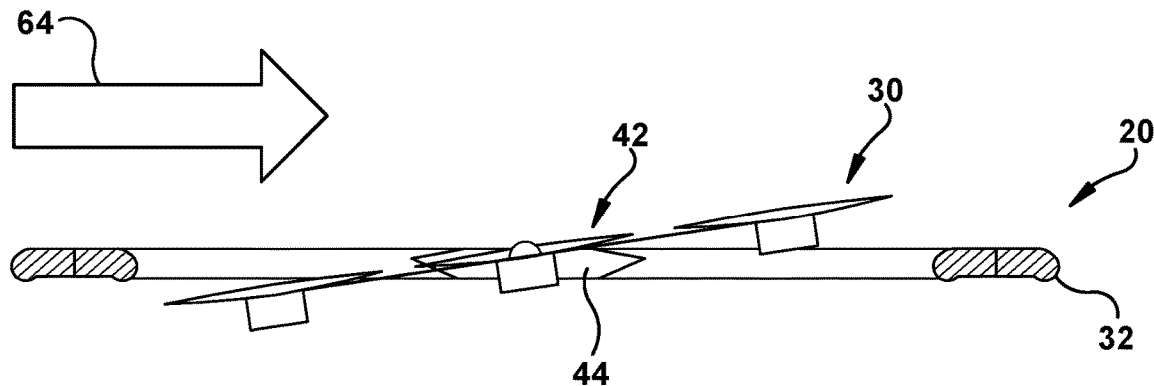
FIG. 7A is a schematic side view of the aerial platform of FIG. 1 in flight, in partial cross-section.
Figure 7B:
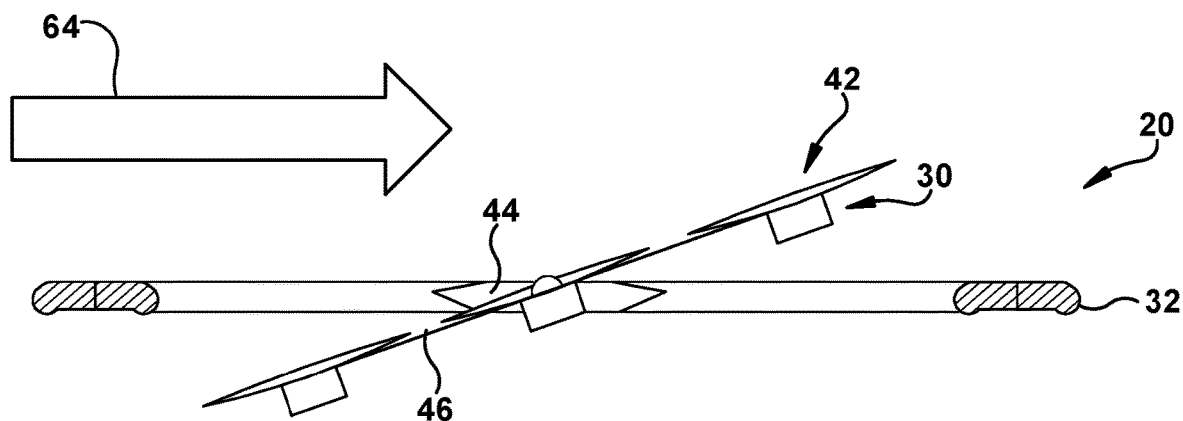
FIG. 7B is another schematic view of the aerial platform of FIG. 1 in flight, in partial cross-section.

The inertial gimballing of the aerial platform allows the aerodisk structure—the outer wing 32—to remain relatively stable in response to prevailing wind or during movement, such as with an edge presented to the direction of wind or with the central plane 62 (FIG. 4) of the aerodisk maintained generally horizontally with respect to the ground. See, for example FIGS. 7A and 7B showing the pivoting movement of the central section 30 and motive devices 42 to allow an outer edge 36 or 38 of the outer wing 32 to be presented to different magnitudes of prevailing winds 64. By precise control and rapid response of the motive devices 42, to be further explained in detail, a fixed angle of attack of the outer wing 32 may be controlled, including adjusting for negative pitch of the outer wing 32 due to forward movement.

Referring again to FIGS. 3-5, at least two of the depicted motive devices 42 are oppositely disposed to one another, such as about the gimballing element 34 and the central lateral axis 60. In particular, the motive devices 42 are arranged symmetrically with respect to forward and aft groupings split by the interconnecting element 34. More particularly, the motive devices 42 are arranged axisymmetrically with respect to the outer body 32, providing for balanced maneuvering and increased stability of the aerial platform 20. The motive devices 42 are also disposed about, such as equally circumferentially disposed about, the center of gravity of the aerial platform 20.

As shown, at least two, and particularly six, motive devices 42 are provided, though any suitable number may be used. The motive devices 42 are inboard, or inwardly disposed, motive devices 42, such that the outer wing 32 is presented to prevailing winds or forward movement, providing an aerodynamic construction of the aerial platform 20.

The illustrated motive devices 42 are interiorly located with respect to the outer wing 32 and are thus referred to as inboard rotors 71-76. It will be appreciated that FIGS. 3-5, 7A and 7B show the blades 80 in movement and are represented by a schematic disk showing the rotation of the radially outermost point of each blade, with respect to the respective center rotational axes 84 of the blades. Blade diameter, represented by the diameter of the schematic disk may be in the range of about 30 to about 50 inches, such as about 42 inches, for example.

The rotors 71-76 have uniform blade length, providing for balanced flight dynamics. It will be appreciated that the blades 80 of the illustrated inboard rotors 71-76 are not ducted. Though in other embodiments, one or more inboard rotors may be ducted.

Figure 6A:
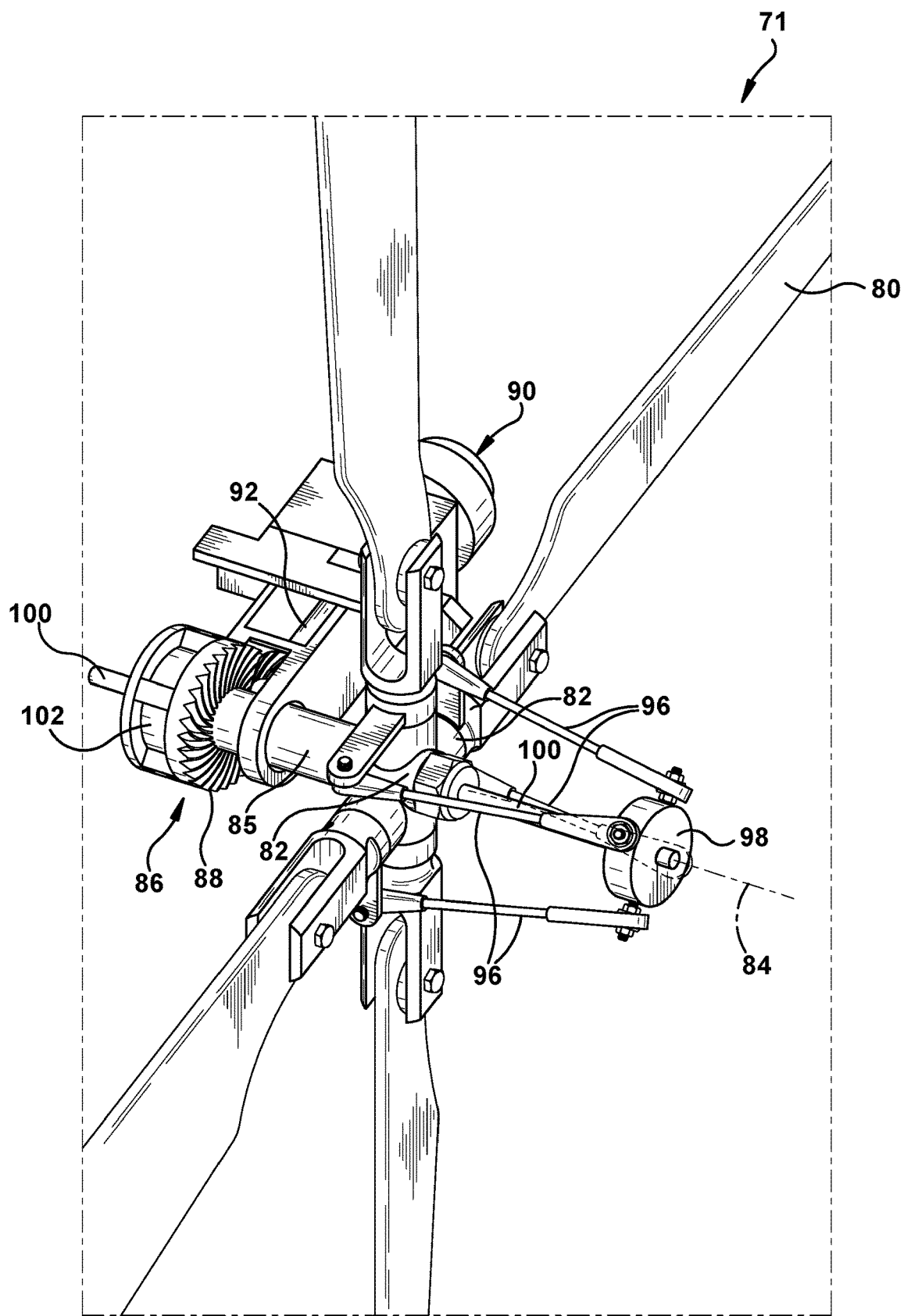
FIG. 6A is an orthogonal view of a motive device for use in the aerial platform of FIG. 1.
Figure 6B:
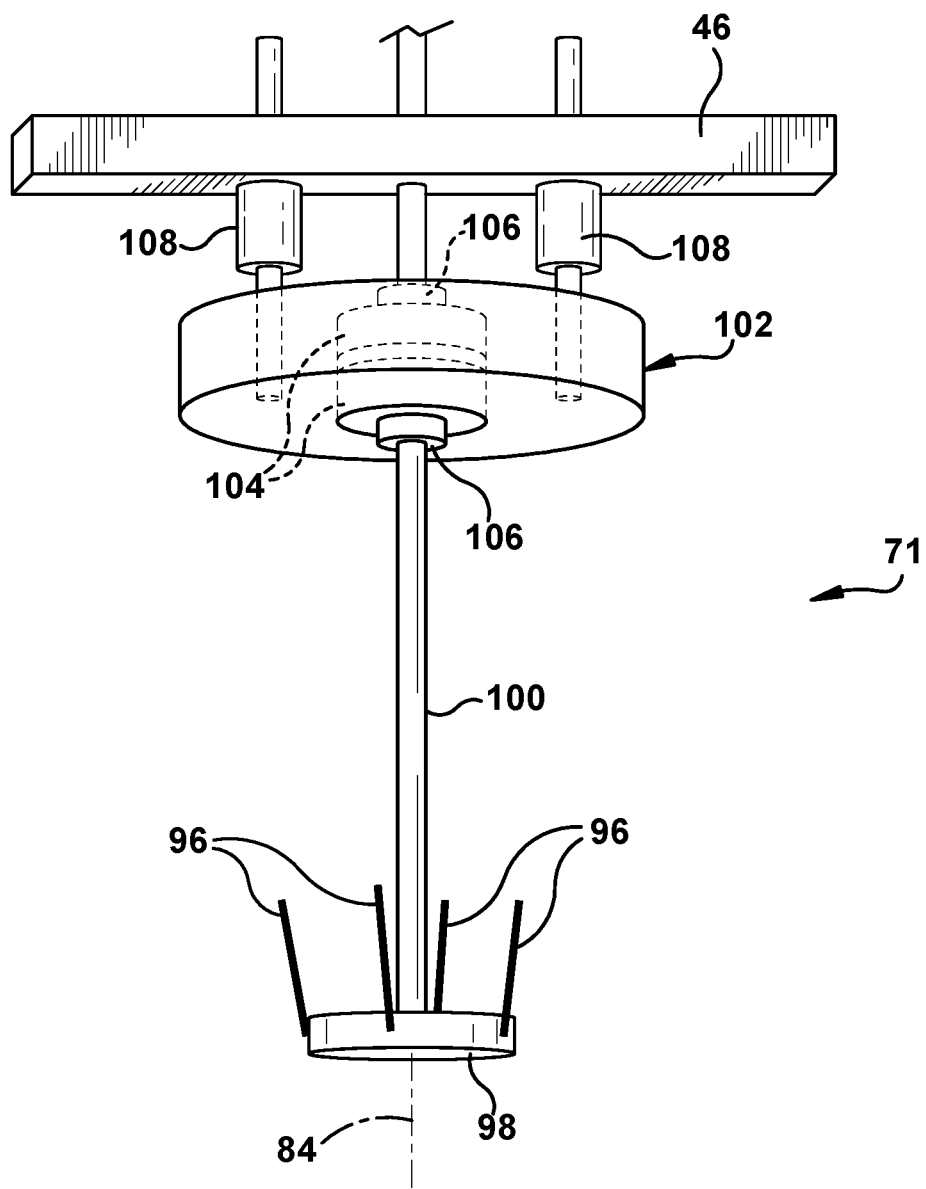
FIG. 6B is a schematic view of a portion of the motive device of FIG. 6A omitting the blades and blade hub for ease of viewing.

Referring now to FIGS. 6A and 6B, the inboard rotor 71 is shown in greater detail, though the details described herein are applicable to each of the inboard rotors 71-76. The inboard rotor 71 includes a plurality of blades 80, such as the four depicted blades 80. Each of the blades 80 of the rotor 71 is synchronously rotatable about the respective center rotational axis 84. Other embodiments may include any suitable number of blades 80.

The blades 80 are each rotatably coupled to a blade hub 82. A hub shaft 85 extends from the hub 82 to a gear subassembly 86. The illustrated gear subassembly 86 includes a right angle gear 88, rotatably coupling the hub 82 to a motor 90. The motor 90 has a motor shaft 92 extending orthogonally with respect to the hub shaft 84, thus minimizing the height or normal profile of the aerial platform 20.

To enable rapid maneuvering response, the pitch of each of the blades 80 is variable. As shown, each blade 80 is rotatable about a respective longitudinal blade axis 94 extending longitudinally along each respective blade 80 to adjust blade pitch. A pitch control arm 96 is coupled between a pitch plate 98 and a proximal portion of each blade 80 adjacent the blade hub 82. The pitch plate 98 is affixed to a pitch rod 100. The pitch rod 100 is coupled, such as fixedly coupled, to at least one of the hub 82 or hub shaft 85 such that the pitch plate 98, pitch rod 100, and pitch control arms 96 rotate with the hub 82 and blades 80 about the center rotational axis 84, driven by the motor 90. The pitch rod 100 is disposed along the center rotational axis 84 of the rotor 71. The pitch rod 100 is axially movable along the axis 84 to effect rotation of the blades 80, thereby changing the pitch of the blades 80.

A support box 102 is disposed at a distal end of the pitch rod 100 adjacent the gear subassembly 86. The support box 102 includes one or more thrust bearings 104 disposed about the pitch rod 100. The thrust bearings 104 are rotationally fixed relative to the support box 102. Also, the thrust bearings 104 are axially coupled to the pitch rod 100, such as via stops 106 affixed to or integral with the pitch rod 100. The pitch rod 100 is axially fixed relative to the thrust bearings 104 such that axial movement of the thrust bearings 104 causes axial movement of the pitch rod 100.

The support box 102 and the thrust bearings 104 are not driven to rotate with the pitch rod 100 and blade hub 82. Rather, at least one linear movement device 108, such as two oppositely disposed servos, are coupled to the thrust bearings 104, such as via the support box 102. It will be appreciate that any suitable linear movement device 108, such as actuators having electrical, mechanical, or magnetic actuation or a combination thereof. It will also be appreciated that while two servos are included for load sharing purposes, one or more linear movement devices 108 may be used.

Actuation of the linear movement devices 108 causes axial movement of the support box 102 and the thrust bearings 104, in turn causing axial movement of the pitch rod 100 along the center rotational axis 84. This effects axial movement of the pitch control arms 96 also along the center rotational axis 84, thereby varying the pitch of the blades 80. Thus the pitch of each of the blades 80 of the inboard rotor 71 is adjustable in unison.

By varying the pitch of the blades 80 themselves, rather than variably canting the rotors 71-76—by varying the pitch of a rotational plane 110 (FIG. 4) of the blades 80 such as by angling the blade hub 82—faster and more precise maneuverability of the aerial platform 20 is obtained with a rapid response time for varying blade pitch. Accordingly, the blade planes of rotation 110 of the rotors 71-76 are parallelly disposed to and fixed relative to one another, and the complexity and weight of the central section 30 is limited.

To vary altitude or maneuver the platform 20, each of the rotors 71-76 may be rotated via a suitable motor at a uniform or generally same speed. Due to the ability to selectively and synchronously vary blade pitch of each blade 80 of each of the rotors 71-76 separately, blade pitch of one or more of the rotors 71-76 may be varied, thus changing the output force provided by the one or more of the rotors 71-76. It will be appreciated that the single speed may be maintained throughout flight, or that that the speed of the rotors 71-76 may be synchronously varied by the one or more motors driving the rotors 71-76.

This variable pitch capability enables a more compact, less complex motor 90 to be used with each rotor 71-76 as compared to use of differential speed motors or rotors. Accordingly, overall weight of the aerial platform 20 is limited, while maximizing maneuverability due to limited weight and limited component profile of the respective motors 90. Furthermore, the variable pitch capabilities of the motive devices 42 allows for overspeed protection in the case of high winds to prevent overspeed of the respective drive motor 90.

A suitable control unit for controlling stabilization, loft and other maneuvering of the aerial platform by controlling the variable pitch of the rotors 71-76 may be located in the central section 20, such as in the central body. Additionally or alternatively, a suitable control unit may be disposed in the outer wing 32. The control unit may perform some actions autonomously, such as balance and position trim to maintain stability of the aerial platform. Alternatively the control unit may be otherwise controlled such as wirelessly or via wired control, such as via the tether 24.

The combination of gimballing of the motive devices 42 (inboard rotors 71-76) relative to the outer wing 32 and the variable pitch capabilities of the motive devices 42 provide for overcoming many of the aforementioned challenges of conventional aerial platforms. Impulse response for maneuverability of the aerial platform 20 is rapid due the variable pitch capability. Likewise, the aerial platform 20 may be initially rapidly deployed.

Gimballing and the unique construction of the motive devices 42 enable the aerial platform 20 to have a low profile thereby providing a low radar and visibility cross section and reducing drag on the aerial platform 20. The gimballing further enables the winged aerial platform 20 to have a stabilized outer wing 32. For example, the angle of attack of the wing 32 requires minimal or no increase (which can negatively result in increased induced drag on the wing 32) at slow movement speeds of the aerial platform 20.

With these capabilities, the stabilized outer wing 32 may remain with a fixed angle of attack when gusts of wind emerge or when entering a field of wind where the winds have increased or decreased relative to prior flight conditions. With a stabilized outer wing 32, the aerial platform 20 can ascend to higher altitudes with minimum angle of attack. Thus the aerial platform 20 is subject to lower drag forces than typically associated with a typical climb maneuver where the angle of attack is increased. Likewise, in a descent maneuver, the angle of attack of the stabilized outer wing 32 can be maintained at near zero or at a slight positive angle or slight negative angle. Because the attack angle at a descent maneuver is not required to be highly negative, effects of wind gusts on the stabilized wing 32 such as drag and body torques are minimized.

In a situation where the tether 24 is omitted or disconnected from the aerial platform 20, the wing (32) and variable pitch rotor (71-76) configuration results in an un-tethered platform capable of maintaining generally zero ground speed (stability and stagnancy relative to a single ground position). Stabilization of the outer wing 32 controls a fixed scan orientation relative to the horizon of a payload scanning or camera device, such as radar inside the leading edge of the outer wing 32, during vertical maneuvers. In this way, radar and/or sensors of the aerial platform 20 may be more efficient and/or be able to provide maximum accuracy of readings.

Accordingly, the present disclosure provides a method of maneuvering the aerial platform 20 including the steps of (a) driving rotation of blades 80 of each of the motive devices 42 at a uniform speed, and (b) selectively adjusting blade pitch of each blade 80 of at least one of the motive devices 42 to vary the motive force provided by the respective motive device 42. The method may further include the step of (c) causing the motive devices 42 to rotate about a pivot axis 61 defined by the gimballing element 34, such as via the selectively adjusting blade pitch step (b).

Turning now to FIGS. 10-13, another exemplary embodiment of an aerial platform is shown at 120. The aerial platform 120 is similar to the above-referenced aerial platform 20, and consequently the same reference numerals but indexed by 100 are used to denote structures corresponding to similar structures in the aerial platform 120. In addition, the foregoing description of the aerial platform 20 is equally applicable to the aerial platform 120 except as noted below. Moreover, it will be appreciated upon reading and understanding the specification that aspects of the aerial platforms 20 and 120 may be substituted for one another or used in conjunction with one another where applicable.

The depicted aerial platform 120 includes an outer wing 132 extending about a central section 130. The central section 130 omits a central body and includes a framing element 146 supporting a plurality of inboard rotors 171-176 relative to one another. A gimballing element 134 supports the inboard rotors 171-176 for pivoting movement relative to and radially inward of the outer wing 132. Also included in the aerial platform 120 are at least one outboard rotor. The depicted embodiment include two oppositely disposed outboard rotors 211 and 212 coupled to the outer wing 132.

The outer wing 132 is an annular wing having a non-planar configuration. As illustrated, the outer wing 132 has a hexagonal shape having vertically offset forward and aft edges 136 and 138. The aft edge 138 is vertically offset higher than the forward edge 136. This configuration may enable the aerial platform 120 to encounter less drag and have greater aerodynamic stability in response to prevailing winds or other wind gusts.

Alternatively, it will be appreciated that in other embodiments, the outer wing 132 may have a planar configuration.

The depicted inboard rotors 171-176 are provided for maneuvering the wing 132 and are gimbaled to the wing 132 via the gimballing element 134. The six inboard rotors 171-176 are disposed about, such as equally circumferentially disposed about, the center of gravity of the aerial platform 120. As shown, the rotors 171-176 have uniform blade length, and numerous of the rotors 171-176 have blade rotation planes 210 vertically offset from one another. This configuration integrates with the vertically offset wing configuration of the wing 132 to further provide greater aerodynamic stability during maneuvering of the aerial platform 120.

The outboard rotors 211 and 212 are turbines for generating power for the aerial platform 120, and are herein also referred to as bladed turbines 211 and 212. The bladed turbines 211 and 212 are provided to enable the aerial platform 120 to remain airborne and untethered from a power source for long periods of time. The application may enable the aerial platform 120 to remain airborne indefinitely in a situation where winds are consistent enough to enable generation of a suitable amount of power for powering the inboard rotors 171-176 and any other essential systems, such as a controller.

As shown, opposed turbines 211 and 212 are coupled to the wing 132 at the forward and aft edges 136 and 138. Thus there is a forward turbine 211 at the forward edge 136 and an aft turbine 212 at the aft edge 138. The turbines 211 and 212 are oppositely aligned about the gimballing element 134.

It will be appreciated that while two turbines 211 and 212 are shown, one or more turbines 211 and 212 may be used. Though the use of oppositely disposed turbines may enable for greater stability of the aerial platform 120. For example, one turbine may zero-out or balance torque to the aerial platform 120 from the other of the oppositely disposed turbines as the other of the oppositely disposed turbines spins a generator under load.

Referring now to the turbine 211, but equally applicable to the rotor 212, there is a rotational shaft 216 to which are fixed a plurality of blades 214 via central blade hub 213. The plurality of blades 214 of the rotor 211 are not adjustable for variable pitch, though in other embodiments, this function may be incorporated as explained above with reference to the rotors 71-76. While three blades 214 are shown, any suitable number may be used.

At least a portion of the rotational shaft 216 may be housed in a shaft support 217. The shaft support 217 includes a generator 218 coupled to the rotational shaft 216, such as a high torque drive, for transferring wind energy into energy for use by the aerial platform 120. A gear reduction assembly 219 may also be included coupled to one or both of the generator 218 and shaft 216.

The drive 218 may be electrically coupled to a power source, such as rechargeable batteries, for allowing storage of power generated by the generator 218. The power source may be housed in the outer wing 132. Alternatively, the aerial platform 120 may include a central body having a rechargeable power source, for being charged by the turbines 211 and 212.

The turbine 211 may have an adjustable angle relative to the wing 132. For example, at least a portion of the illustrated shaft support 217 is gimbaled relative to the wing 132, such as being pivotably coupled to a turbine support 190 that is coupled to the wing 132. As shown a gimballing element, such as a pin 221, represents a single degree of freedom pivot axis about which the rotational shaft 216, blades 214, and blade hub 213 are pivotable relative to the wing 132. It will be appreciated, that in other embodiments the pin 221 may be omitted and the shaft support 217 or rotational shaft 216 may be otherwise suitably pivotably affixed to the turbine support 190 or wing 132.

The pivoting of the turbines 211 and 212 allows for variable canting of the turbines, also referred to as variable vertical furling or vertical furling. The furling allows for upward furling for both takeoff/landing and overspeed protection to protect the turbines 211 and 212, thus accounting for high wind to prevent catastrophic failure of the turbine units.

Additionally, the furling allows the turbines 211 and 212 to be placed into an autorotation vertical orientation via upward furling in the case that an emergency recovery of the platform 120 at altitude is necessary. In a case where the turbines 211 and 212 are not furled, the counter rotation of the respective blades 214 could prevent a spinning type of autorotation recovery of the platform 120.

The furling of each of the turbines 211 and 212 generally takes place in a central plane intersected by the rotational axis of the gimballing element 134. Each turbine 211 and 212 is configured to move through a vertical arc range that is generally less than about 120 degrees overall, and typically about 90 degrees overall between a vertical position for stowing (during take, landing and autorecovery) and a position extending directly outwardly from one another.

Such variable furling may be selectively controlled via an actuator 215. The depicted actuators 215 are linear actuators, although a rotary actuator may also be suitable, After takeoff, landing, or autorecovery, the blades 214 of the outboard rotors 211 and 212 are positionable radially outwardly of the wing 132.

The vertical furling range necessary for overspeed protection may be about 5 degrees overall to about 50 degrees overall, or more preferably about 10 degrees overall to about 30 degrees overall. To allow for this range, the turbines 211 and 212 may be resiliently biased to enable automatic pivoting in response to high winds for overspeed protection. For example, the actuators 215 may allow for automatic adjustment relative to a direction of a prevailing wind for overspeed protection, if necessary. And or the actuators 215 may actuate to cause the furling in response to readings received from onboard or off-board wind sensors.

Figure 14:
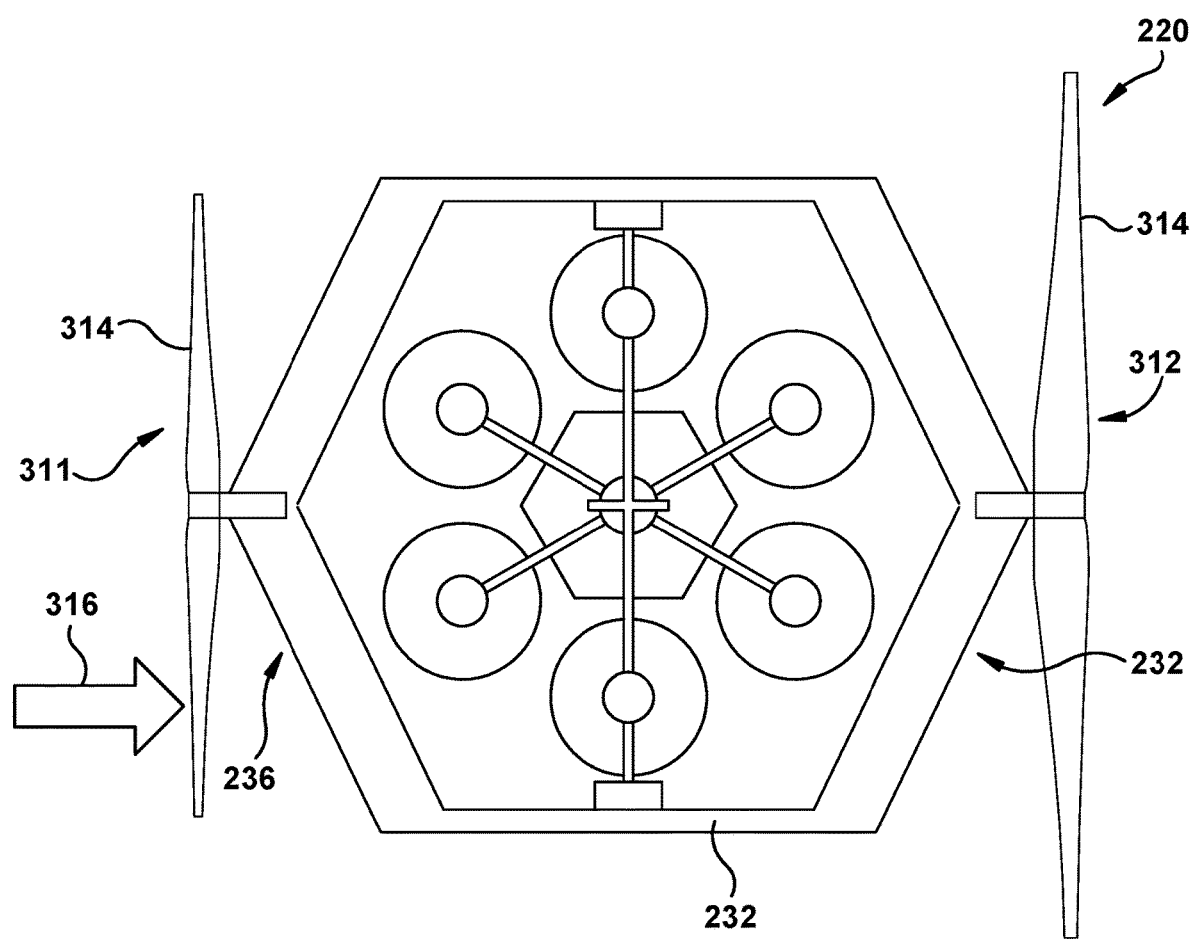
FIG. 14 is a schematic top view of another aerial platform in accordance with the disclosure.
Figure 15:
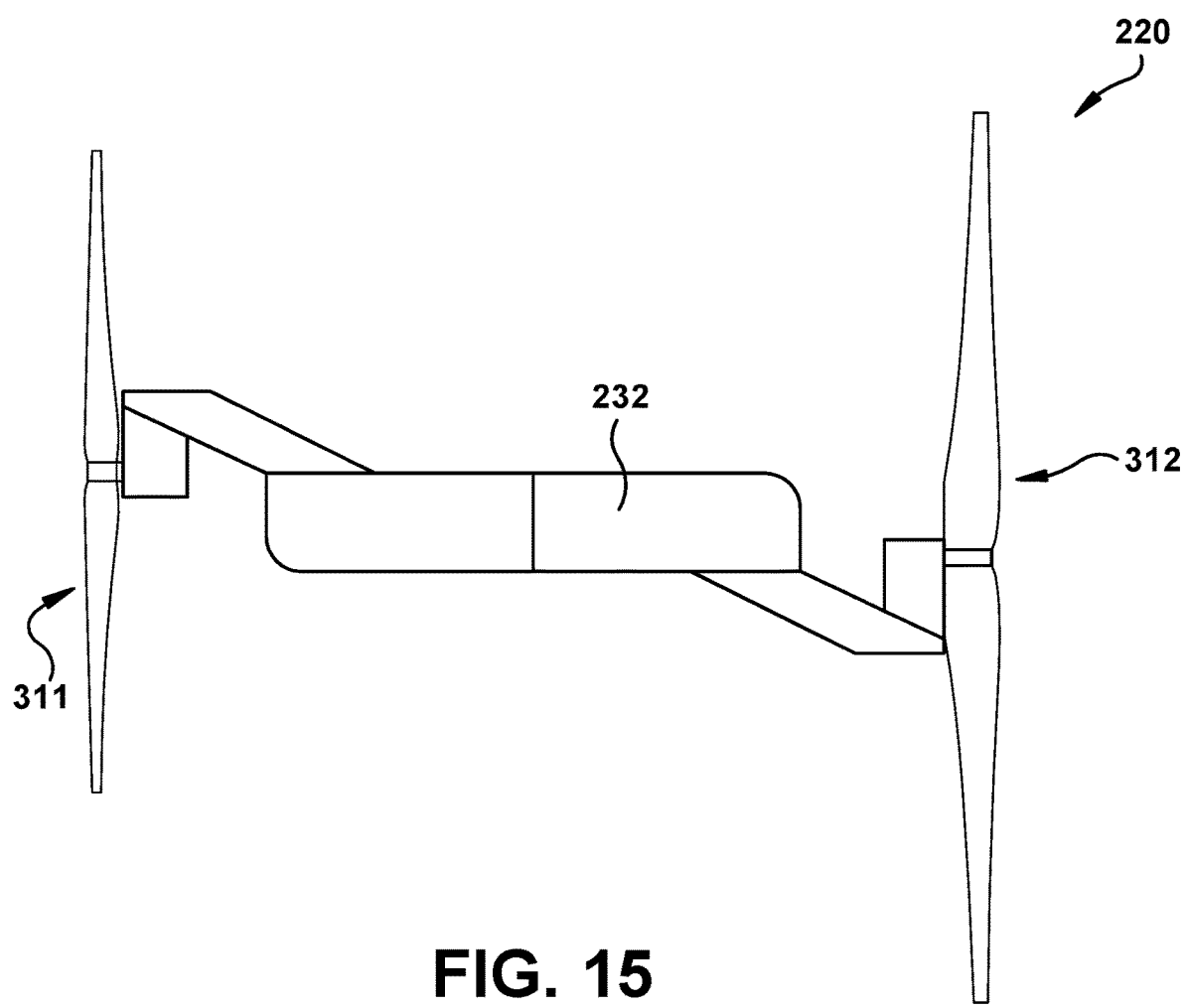
FIG. 15 is a schematic side view of the aerial platform of FIG. 14.

Turning next to FIGS. 14 and 15, another embodiment of an aerial platform similar to the aerial platform 120 is shown at 220. It will be appreciated that aspects of the aerial platforms 20, 120 and 220 may be substituted for one another or used in conjunction with one another where applicable.

The aerial platform 220 includes an outboard rotor 311 at a vertically lower forward edge 236 of the wing 232 and an oppositely disposed outboard rotor 312 at a vertically upper aft edge 238. The forward outboard rotor 311, also herein referred to as a turbine 311, includes blades 314 of shorter length than the blades 314 of the aft outboard rotor 312. Thus, with respect to the direction 316 of wind moving across the aerial platform 220, the upstream outboard rotor 311 includes blades 314 of shorter length than the blades 314 of the downstream outboard rotor 312, also herein referred to as a turbine 312.

Accordingly, the present disclosure provides a method of maneuvering the aerial platforms 120 and 220 including the steps of (a) driving the motive devices 171-176 to obtain and maintain loft of the aerial platform 120, 220, and (b) controlling position of the aerial platform 120, 220 relative to the ground via (i) adjusting pitch of blades of the motive devices 171-176, and (ii) generating power via at least one bladed turbine 211, 212, 311, 312 of the aerial platform 120, 220.

In summary, and with reference to each of the aforementioned embodiments, the present disclosure provides an aerial platform 20, 120, 220 including a wing 32, 132, 232, such as an annular wing, having inboard variable pitch rotors 71-76, 171-176, which may be powered by a ground-connected tether 24. The rotors 71-76, 171-176 are gimbaled relative to the wing 32, 132, 232, such as to enable a fixed angle of attack to be maintained both when in response to a force acting on the wing 32, 132, 232, such as when countering wind, and during forward movement to counter negative pitch caused by the movement. The rotors 71-76, 171-176 are fixedly coupled to one another and are gimbaled for pivoting movement inwardly of the wing 32, 132, 232. Blades 80, 180 of each respective rotor 71-76, 171-176 have respective planes of rotation 110, wherein the planes of rotation 110 are fixed relative to one another.

The present disclosure also provides, with reference to each of the aforementioned embodiments, an aerial platform 20, 120, 220 having motive devices 42, 142, 71-76, 171-176 for obtaining and maintaining loft of the aerial platform 20, 120, 220, the motive devices 42, 142, 71-76, 171-176 being pivotable relative to a wing 32, 132, 232 of the aerial platform 20, 120, 220 for aerial maneuvering of the aerial platform 20, 120, 220 while generally maintaining stable disposition of the wing 32, 132, 232 relative to the ground. The motive devices 42, 142, 71-76, 171-176 may include blades 80, 180 having selectively adjustable pitch for varying output force of respective motive devices 42, 142, 71-76, 171-176. The aerial platform 20, 120, 220 may further include one or more bladed turbines 211, 212, 311, 312 outwardly coupled to the wing 32, 132, 232 and drivable by wind for generating power for the aerial platform 20, 120, 220. In some cases, the aerial platform 20, 120, 220 may be tethered via a flexible power cable 24 to a power source 22.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aerial platform, comprising:
a central section including at least two motive devices for providing loft of the aerial platform;
an outer wing extending at least partially about the central section; and
a gimballing element interconnecting the central section and the outer wing for allowing rotation of the central section relative to the outer wing about a pivot axis of the gimballing element;
wherein the at least two motive devices include a forward motive device and an aft motive device, with the pivot axis between the forward motive device and the aft motive device.

2. The aerial platform of claim 1, wherein the at least two motive devices are oppositely disposed to one another about the gimballing element.

3. The aerial platform of claim 1, wherein each of the motive devices includes a plurality of blades, each blade of a respective plurality of blades being synchronously rotatable about a respective blade axis extending longitudinally along each respective blade.

4. The aerial platform of claim 1, wherein each of the motive devices includes blades having a plane of rotation, wherein the planes of rotation of the motive devices are fixed relative to one another.

5. The aerial platform of claim 1, wherein each of the motive devices includes rotatable blades having a plane of rotation, wherein the planes of rotation of the motive devices are parallelly disposed to one another.

6. The aerial platform of claim 1, wherein the outer wing is an annular outer wing.

7. The aerial platform of claim 1, further comprising a radar disposed along a radially inner portion of the outer wing.

8. The aerial platform of claim 1, further including at least two oppositely disposed bladed rotors coupled to the outer wing and positionable for blade rotation radially outwardly of the outer wing.

9. The aerial platform of claim 1, in combination with a power source for supplying power to the aerial platform and a flexible power cable extendable between the power source and the aerial platform for tethering the aerial platform to the power source.

10. The aerial platform of claim 1,
wherein the at least two motive devices further include an additional forward motive device and an additional aft motive device, with the pivot axis between the additional forward motive device and the additional aft motive device; and
wherein the at least two motive devices further include motive devices that are along the pivot axis.

11. The aerial platform of claim 1,
wherein the central section includes a central body, with a center of gravity of the aerial platform located within the central body; and
wherein the central body rotates as a unit with the at least two motive devices.

12. The aerial platform of claim 11, wherein the at least two motive devices are axisymmetrically circumferentially disposed about the central body, with equal distance between adjacent of the motive devices in a circumferential direction about the central body.

13. The aerial platform of claim 1, wherein the outer wing has a wingspan of ten feet or less.

14. A method of maneuvering the aerial platform of claim 1 including the steps of:
driving rotation of blades of each of the motive devices at a uniform speed; and
selectively adjusting blade pitch of each blade of at least one of the motive devices to vary the motive force provided by the respective motive device.

15. The method of claim 14, further including the step of causing the motive devices to rotate about the pivot axis defined by the gimballing element.

16. An aerial platform, comprising:
a body; and
at least two variable pitch rotors fixedly coupled to one another and gimbaled to the body for pivoting movement about a pivot axis;
wherein blades of each respective rotor of the at least two rotors have a respective plane of rotation, wherein the planes of rotation are fixed relative to one another; and
wherein the at least two variable pitch rotors include a forward variable pitch rotor and an aft variable pitch rotor, with the pivot axis between the forward variable pitch rotor and the aft variable pitch rotor.

17. The aerial platform of claim 16, wherein the body includes a wing having an annular shape, and wherein the at least two variable pitch rotors are gimbaled for pivoting movement inwardly of the wing.

18. The aerial platform of claim 17, in combination with a ground unit and a tether extending between the ground unit and the aerial platform.

19. The aerial platform of claim 18,
further comprising a central body fixedly attached to and between the rotors;
wherein the central body and the rotors are gimbaled to rotate as a unit relative to the wing about the pivot axis;
wherein a center of gravity of the aerial platform is located within the central body; and
wherein the central body includes a tether attachment that is coupled to the tether.

* * * * *